Jan. 7, 1930.                M. D. CHURCH                1,742,580
             ELASTIC FLUID ENGINE POWER INSTALLATION
                        Filed Nov. 2, 1927
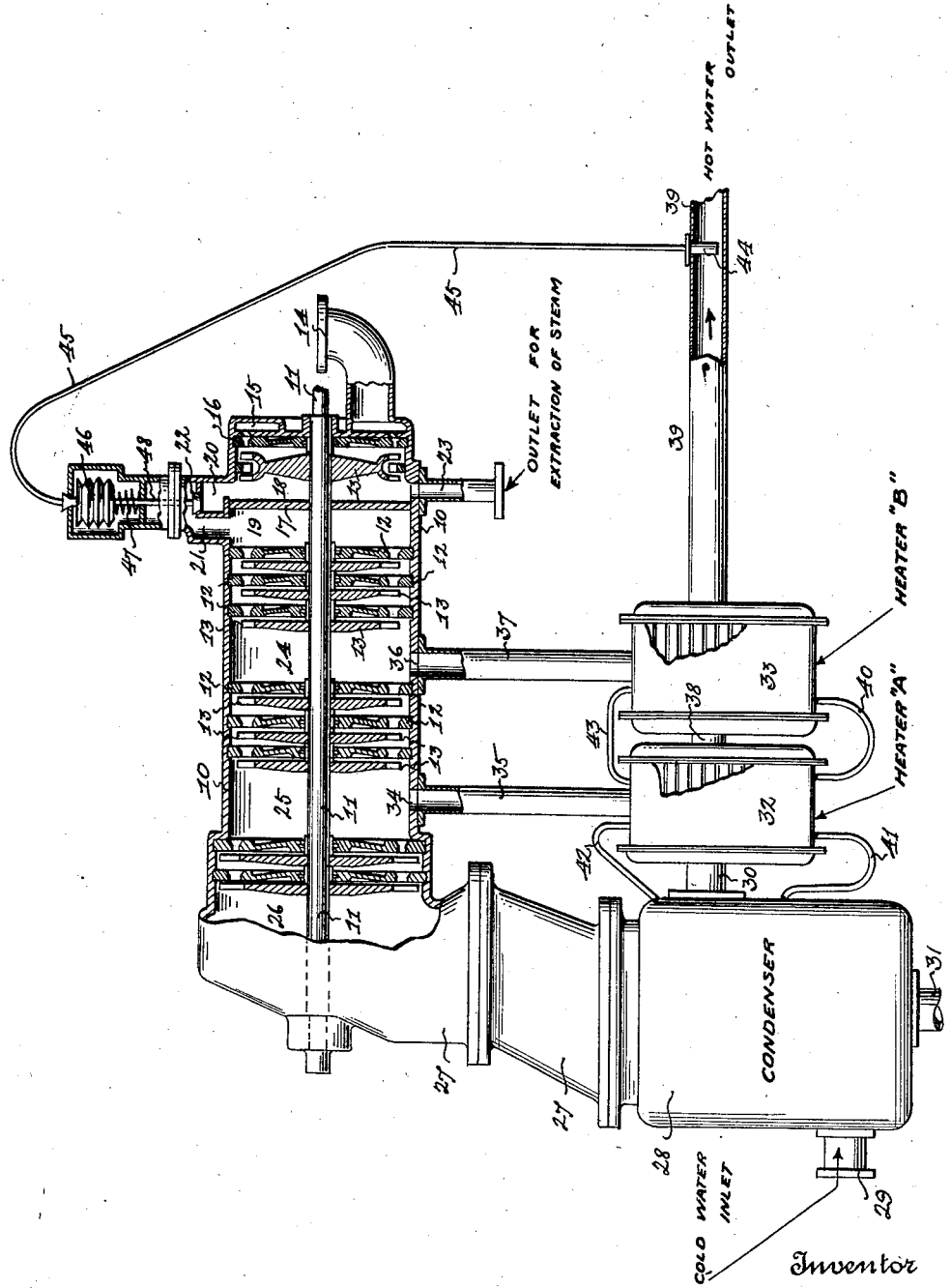

ID MARKER

UNITED STATES PATENT OFFICE

MAYNARD D. CHURCH, OF WELLSVILLE, NEW YORK, ASSIGNOR TO MOORE STEAM TURBINE CORPORATION, OF WELLSVILLE, NEW YORK, A CORPORATION OF NEW YORK

ELASTIC-FLUID ENGINE POWER INSTALLATION

Application filed November 2, 1927. Serial No. 230,632.

This invention relates to elastic fluid multiple expansion engine installations in which a heating of a fluid in one or a plurality of steps is effected by means of bleeder motive fluid, and in addition a portion of said motive fluid after expansion and not used for heating a fluid is capable of being diverted for other uses as may be desired.

The object of the invention is to provide an organization of instrumentalities in a multiple expansion engine installation in which the bleeder or expanded low pressure fluid from one or more stages of expansion will pass to a heater or heaters to heat a fluid in one or more steps to a desired temperature, and said motive fluid expanded to the lowest practicable pressure to produce as much power as possible before being used for the heating of said fluid, and only as much of the expanded motive fluid is passed through the low pressure stages of expansion to said heater or heaters to effect the desired temperature of said fluid, and discharge or divert for one or more uses where such expanded fluid may be desired, any surplus or excess-expanded motive fluid within the engine and not used in the lower stages of expansion or passed through the heaters.

A further object of the invention is to provide an installation of the character and operation above indicated in which the bleeder or low pressure fluid from one or more stages of expansion entering the fluid heater or heaters and the discharge or diversion of the surplus or excess expanded motive fluid is predeterminedly and automatically controlled by the temperature of the heated fluid issuing from the installation.

Another object of the invention is to provide an installation of the character and operation above recited in which by varying the amounts of the discharged or diverted expanded motive fluid for other use exterior of the engine, the engine may be made to carry a variable load, or the expanded low pressure fluid to heat said fluid may be varied.

Other objects and advantages of the invention will appear from the detailed disclosure of the construction and arrangement of the several instrumentalities and mode of operation.

The invention consists of structural characteristics and relative arrangements of the several elements and mechanical expedients, which will be hereinafter more fully disclosed and particularly pointed out in the appended claims.

In the drawings, which represent a diagrammatic view, partly in section, of one and the preferred form of the improved installation, as applied to a bleeder multi-stage expansion turbine, and while a turbine is herein shown any form of multiple expansion elastic fluid engine may be substituted therefor, if so desired;

10 is the usual casing provided with a rotary shaft 11, and secured to said casing 10 are provided nozzle diaphragms 12, 12, which cooperate with the rotor elements or wheels 13, 13, fixed to said shaft 11, as is usual in this type of turbine and needs no further explanation, and while I have shown, as illustrated, nine rotor elements or wheels and nine stages of expansion, said number of rotor elements or wheels and stages of expansion may be increased or decreased without in any way departing from the essential features of the present invention.

14 is the high pressure motive fluid or live steam inlet leading to a chamber 15 communicating through a nozzle ring 16 with the first stage rotor or wheel and said motive fluid or live steam may be controlled, if so desired, by any suitable form of valve and usual governor connections, not shown and need no further disclosure.

17 is an imperforate diaphragm separating the first stage of expansion from the second and following stages of expansion and forms two separated chambers 18 and 19 within the turbine casing, as shown, and said chambers 18 and 19 are in communication with each other by interconnected passages 20 and 21 controlled by a valve 22, the function and operation of which will be hereinafter more fully described.

23 is a secondary or auxiliary exhaust passageway connected with the interior of chamber 18 for the purpose of bleeding or extracting low pressure motive fluid, and for functions to be presently described.

24 is a chamber similar to chamber 19 and is shown between the fourth and fifth stages of expansion, and a similar chamber 25 is provided between the seventh and eighth stages of expansion, and while this disposition of said chambers 18, 19, 24 and 25 is herein shown, this particular arrangement could be varied in number and arranged intermediate of any two stages of expansion, depending upon the initial motive fluid pressure, and nature of work to be accomplished and condition of service to be satisfied.

The final exhaust chamber 26 communicating with the last or ninth stage of expansion of the engine is connected by means of conduit 27 with the usual surface condenser or heater 28 having the cold fluid or water inlet 29 and outlet 30 and condensed motive fluid or steam outlet 31, as shown.

32 (heater A) and 33 (heater B) are auxiliary condensers or heaters which are connected respectively to the chambers 25 and 24, as shown. Said heater 32 is connected by means of bleeder opening 34 and conduit 35 to the chamber 25 between the seventh and eighth stages of expansion, while the heater 33 is connected by bleeder opening 36 and conduit 37 to the chamber 24 between the fourth and fifth stages of expansion, this connection of the bleeder openings to said stage or stages of expansion may be varied as desired to give best results under different conditions of service.

The fluid or water to be heated passes through fluid passages of condensers or heaters 28, 32 and 33 in series or succession. Cold fluid enters the heater or condenser 28 through inlet 29, passes through heater 28, enters heater (A) 32, through conduit 30, passes to heater (B) 33, through conduit 38 and leaves heater (B) 33 through conduit 39, from thence it passes to the points of use or storage, and while I have shown and preferably desire to use surface condensers or heaters, any other type may be employed, if so desired.

40 and 41 are pipes leading and carrying the condensed fluid or steam formed in the heaters 32 and 33 to the interior of the condenser or heater 28 and out through the outlet 31, as will be readily understood and need no further disclosure.

42 and 43 are pipes leading from and interconnecting the condenser or heater 28 with the heaters 32 and 33 for carrying the air within said heaters 32 and 33 to the proper connections with the condenser 28, as will be readily understood and need no further explanation.

Within the hot fluid or water outlet or conduit 39 is provided a bulb 44 of a temperature responsive device, said bulb 44 containing a volatile liquid, such as ether, and is disposed in the path of the outgoing heated fluid or water, as shown.

The interior of the bulb 44 is connected by means of a tube having a small bore to a chamber formed within a collapsible diaphragm 46 of said temperature responsive device, said diaphragm 46 being loaded or resisted in its inflation by a spring 47 and is so connected by a rod 48 to the valve 22 to control the position of said valve with respect to its seat for purposes of regulating the communication between the chambers 18 and 19 through the interconnecting passages 20 and 21, and while I prefer to employ the form of heat responsive device herein shown for operating the regulating valve, other types of devices responsive to changes of temperature will readily suggest themselves and could be substituted, or, if found expedient, a manually operated means may be employed to control or adjust the position of the valve 22 with respect to its seat and regulate the flow of expanded fluid from chamber 18 to chamber 19.

The engine installation being constructed and arranged as herein disclosed and there being a supply of fluid to be heated caused to pass through the condenser or heaters and conduits 28, 30, 32, 38, 33 and 39 in series and in the order named, the operation is as follows:

The engine having been started by the proper pressure and supply of high pressure motive fluid or steam entering at the inlet 14 and passing into chamber 15 and nozzle ring 16, said motive fluid or steam acts on the rotor member 13 of the first stage of expansion and its expanded fluid enters the chamber 18 and a portion of said expanded fluid or steam passes out through auxiliary exhaust conduit 23 for use where such expanded fluid may be desired, while all the other portions of said expanded motive fluid or steam passes through the passage 20, valve 22 and passage 21 in the order named through the second, third and fourth stages of expansion into chamber 24, and a portion of this further expanded fluid or steam passes or is bled through the opening 36, and conduit 37 into the condenser or heater 33, while the remainder of the expanded fluid or steam within the chamber 24 passes through the fifth, sixth and seventh stages of expansion into chamber 25 from which chamber 25 a portion of this further expanded and lower temperature motive fluid or steam passes through the bleeder opening 34 and conduit 35 into the condenser or heater 32. The other portion of the exhausted fluid or steam within the chamber 25, after having passed through the eighth and ninth or last two stages of expansion, enters the final exhaust chamber 26 and thence by the conduit 27 passes to the main condenser or heater 28.

The cold fluid or water entering the main condenser or heater 28 by pipe 29 passes through said condenser 28 and is heated to a higher temperature by the final exhausted motive fluid or steam in said condenser. Said partially heated motive fluid continues in its proper circuit and is successively heated in two or more stages to a higher temperature as it passes in series through conduit 30, heater or condenser 32, conduit 38 and heater or condenser 33, and said serially heated fluid or water is conveyed by a conduit 39 to any suitable tank or point of the plant for its proper and efficient use. The condensed motive fluid or steam within the condensers or heaters 32 and 33 is conveyed by the pipes 40 and 41 to the interior of the main condenser or heater 28 and passes out through outlet 31 with the condensed motive fluid or steam in said condenser 28.

The heated fluid or water passing through the conduit 39 comes in contact with the bulb 44, or any other form of temperature controlled device, and if the temperature of said fluid is higher than the previously adjusted or desired temperature, the diaphragm 46 is inflated or expanded and the controlling valve 22 is depressed against the action of the spring 47 toward its seat and reduces and properly varies the amount of expanded motive fluid admitted from the chamber 18 to the subsequent stages of expansion and hence the further expanded motive fluid later entering the fluid heaters 33 and 32 and 28, and thereby correspondingly and properly reduce the quantity and heating effect of the further expanded fluid passing through said heater or heaters.

If the temperature of the outgoing fluid is too low, a contrary action takes place, as will be understood and needs no further explanation.

If it is desired to heat a varying quantity of fluid or fluid entering at a varying inlet temperature to a substantially constant final temperature from time to time to effect the required temperature of the heated fluid in the exit conduit 39, this adjustment may be manual in accordance with observed thermometer variations, or automatic by any temperature controlled device to operate, as disclosed.

Any accumulation of expanded fluid or steam exhausted into the chamber 18 from the first stage of expansion and checked or throttled from passing to the subsequent stages of expansion and fluid heaters is diverted through the secondary or auxiliary exhaust passageway 23 to any suitable low pressure motive fluid line for other purposes about the plant. It will also be seen the engine may carry a variable load, or the demand for expanded motive fluid to heat a fluid may vary, and such variation can be met by discharging or diverting variable amounts of expanded motive fluid from the secondary or auxiliary exhaust passageway 23.

The installation is operated in such a manner as to heat the fluid by the expanded motive fluid from the engine in two or more steps and using in each step the motive fluid which has been expanded in the engine to the lowest practicable pressure and thereby produce as much power as possible from said motive fluid before being used in the heater or heaters for heating a fluid, and divert from the low pressure stages of expansion of the engine into the fluid heaters only enough motive fluid to heat the fluid to the desired temperature, and at the same time reduce to a minimum the expanded motive fluid diverted through the auxiliary exhaust passageway 23.

From the foregoing disclosure of the construction and arrangement of the different instrumentalities of the installation and their mode of cooperation, it will be seen that all the objects and advantages indicated in the statement of invention have been completely carried out and a construction relating to elastic fluid engines has been devised to not only efficiently produce power but heat a fluid at a constant and predetermined temperature with or without automatic control, and said operations are capable of being carried out independent of the type of engine, character of motive fluid used in said engine or fluid to be heated, or construction of automatic controlling means or heaters for said fluid.

What I claim is:

1. A multiple expansion engine installation comprising a plurality of expansion stages, means for supplying high pressure motive fluid to the first stage, a fluid heater, a bleeder passage connecting said fluid heater with a stage of expansion, an exhaust passage connected with a stage of expansion preceding the stage to which said fluid heater is connected, and means controlled by the temperature of the heated fluid for varying the flow of exhaust motive fluid to the stages of expansion subsequent to said exhaust passage as required to predeterminedly heat the fluid in said fluid heater.

2. A multiple expansion engine installation comprising a plurality of expansion stages, means for supplying high pressure motive fluid to the first stage, a plurality of fluid heaters, a bleeder passage for connecting each of said fluid heaters with a separate stage of expansion, an exhaust passage connected with a stage of expansion preceding the stages to which said fluid heaters are connected, and means controlled by the temperature of the heated fluid for automatically varying the flow of exhaust motive fluid to the stages of expansion subsequent to said exhaust passage as required to predeterminedly heat the fluid in said fluid heaters.

3. A multiple expansion engine installation comprising a plurality of expansion stages, means for supplying high pressure motive fluid to the first stage, a plurality of fluid heaters, a bleeder passage for connecting each of said fluid heaters with a separate stage of expansion, conduit means for passing fluid to be heated through said heaters in series, an exhaust passage connected with a stage of expansion preceding the stages to which said fluid heaters are connected, and means controlled by the temperature of the heated fluid for automatically varying the flow of exhaust motive fluid to the stages of expansion subsequent to said exhaust passage as required to predeterminedly heat the fluid in said fluid heaters.

4. A multiple expansion engine installation comprising a plurality of expansion stages, means for supplying high pressure motive fluid to the first stage, a fluid heater, a bleeder passage connecting said fluid heater with a stage of expansion, regulating means intermediate the high pressure fluid admission and said bleeder passage and actuated by the temperature of the heated fluid for controlling the flow of motive fluid through the subsequent stages of the engine and to the heater, and an exhaust passage connected with a stage of expansion intermediate said first stage and said regulating means.

5. A multiple expansion engine installation comprising a plurality of expansion stages, means for supplying a high pressure motive fluid to the first stage, a final exhaust passage connected to the outlet of the last stage of expansion, a fluid heater connected to said final exhaust passage, a second fluid heater, a bleeder passage connecting said second fluid heater with a stage of expansion preceding the last stage of expansion, conduit means for passing fluid to be heated through said heaters in series, controlling means actuated by the temperature of the heated fluid and at a stage of expansion subsequent to the first stage and preceding the stages connected with the fluid heaters for varying the flow of exhaust motive fluid to stages subsequent to the first stage and to said heaters, and an auxiliary exhaust passage connected with a stage of expansion intermediate said first stage and said controlling means for the discharge of any surplus of motive fluid admitted to the first stage.

6. A multiple expansion engine installation comprising a plurality of expansion stages, means for supplying a high pressure motive fluid to the first stage, a final exhaust passage connected to the outlet of the last stage of expansion, a fluid heater connected to said final exhaust passage, a plurality of secondary fluid heaters, a bleeder passage for connecting each of said secondary fluid heaters with a separate stage of expansion preceding the last stage of expansion, conduit means for passing fluid to be heated through said heater in series, controlling means at a stage of expansion subsequent to the first stage and preceding the stages connected with the fluid heaters for varying the flow of exhaust motive fluid to stages subsequent to the first stage and to said heaters, and an auxiliary exhaust passage connected with a stage of expansion intermediate said first stage and said controlling means for the discharge of any surplus of motive fluid admitted to the first stage.

7. A multiple expansion engine installation comprising a plurality of expansion stages, means for supplying a high pressure motive fluid to the first stage, a final exhaust passage connected to the outlet of the last stage of expansion, a fluid heater connected to said final exhaust passage, a plurality of secondary fluid heaters, a bleeder passage for connecting each of said secondary fluid heaters with a separate stage of expansion preceding the last stage of expansion, conduit means for passing fluid to be heated through said heaters in series, controlling means actuated by the temperature of the heated fluid and at a stage of expansion subsequent to the first stage and preceding the stages connected with the fluid heaters for varying the flow of exhaust motive fluid to stages subsequent to the first stage and to said heaters, and an auxiliary exhaust passage connected with a stage of expansion intermediate said first stage and said controlling means for the discharge of any surplus of motive fluid admitted to the first stage.

8. A multi-expansion steam turbine comprising a plurality of expansion stages, means for supplying a high pressure steam to the first stage, a final exhaust steam passage connected to the outlet of the last stage of expansion, a water heater connected to said final exhaust passage, a plurality of secondary water heaters, a bleeder passage for connecting each of said secondary water heaters with a separate stage of expansion preceding the last stage of expansion, conduit means for passing water to be heated through said heaters in series, controlling means at a stage of expansion subsequent to the first stage and preceding the stages connected with the water heaters for varying the flow of exhaust steam to stages subsequent to the first stage and to said heaters, and an auxiliary exhaust passage connected with a stage of expansion intermediate said first stage and said controlling means for the discharge of any surplus steam admitted to the first stage.

In testimony whereof, I have hereunto affixed my signature.

MAYNARD D. CHURCH.